Feb. 20, 1923.
I. H. KENDALL.
MILK SEDIMENT TESTER.
FILED DEC. 8, 1921.
1,445,770.
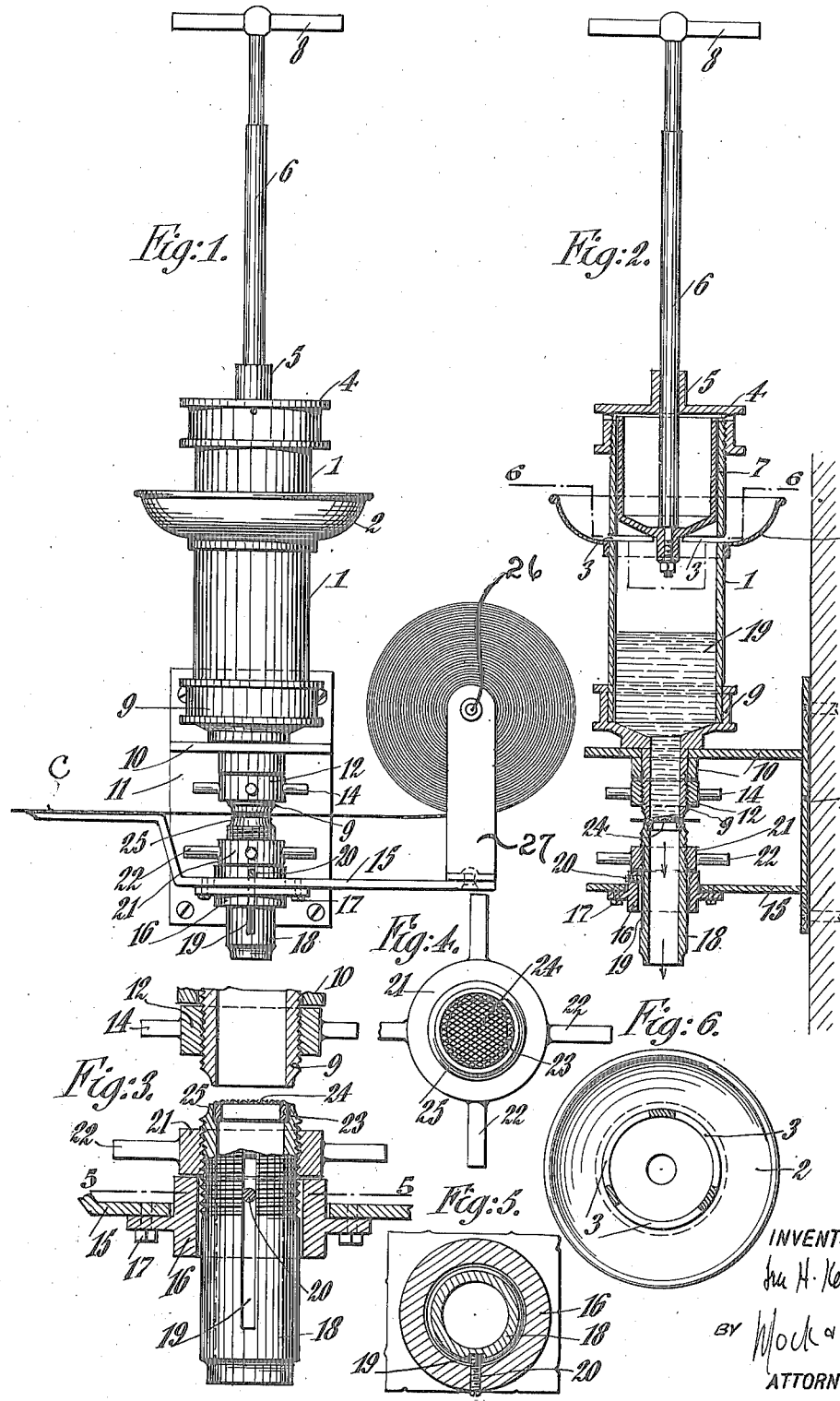

Patented Feb. 20, 1923.

1,445,770

UNITED STATES PATENT OFFICE.

IRA H. KENDALL, OF POTSDAM, NEW YORK.

MILK-SEDIMENT TESTER.

Application filed December 8, 1921. Serial No. 520,826.

*To all whom it may concern:*

Be it known that I, IRA H. KENDALL, a citizen of the United States, residing at Potsdam, in the county of St. Lawrence and State of New York, have invented certain new and useful Improvements in Milk-Sediment Testers, of which the following is a specification.

My invention relates to a new and improved form of milk sediment tester.

One of the important characteristics of milk that largely determines its quality, is the amount of sediment present in a given quantity of milk.

It is therefore extremely important to have an efficient device for continuously testing a series of batches of milk and to enable a record of the amount of sediment present in various quantities of milk to be readily kept.

One of the objects of my invention is to provide an instrument in which the sediment from a series of batches of milk is deposited upon adjacent portions of a continuous roll of cotton or the like.

Another object of my invention is to provide a device having a piston for forcing the milk through the cotton in which the piston will preferably not contact with the milk to be tested.

Other objects of my invention will be set forth in the following description and drawings, which illustrate a preferred embodiment of my invention.

Fig. 1 is a side view.

Fig. 2 is a central section taken in a plane perpendicular to the plane of Fig. 1.

Fig. 3 is a detail view partially in section.

Fig. 4 is an enlarged view of the screen support for the cotton.

Fig. 5 is a section on the line 5—5 of Fig. 3.

Fig. 6 is a section on the line 6—6 of Fig. 2.

The device consists of a casing 1, having a large outstanding flange 2, the chamber which is thus formed being in communication with the interior of the casing 1, by means of a series of holes, 3.

As can be clearly seen in Figs. 1 and 2, the casing 1 extends above and below the flange 2. The casing 1 is externally threaded at its upper portion and is closed by means of a cap 4, which is threaded on the casing 1. The cap 4 has a guide 5 in which the rod 6 of a piston 7 slides and is guided. The rod 6 is provided with a handhold 8. The piston 7 fits tightly within the casing 1, and is of such size that when the top of said piston is substantially in contact with the bottom of the cap 4, that the said piston 7 has cleared the openings 3, so that milk 19 which is poured on the flange can enter into the casing 1. The lower part of the casing 1 is closed by a bottom member 9, which has an externally threaded bottom, as can be clearly seen in Figs. 2 and 3. The said bottom member 9 fits into and is held in, a bracket 10, connected to a support 11, which is suitably secured to any suitable upright. As can be clearly seen in Figs. 2 and 3, the bottom portion of the bottom member 9 has an upper nut 12, provided with handholds 14, movably secured thereto, so that by turning the said upper nut 12, it can be moved upwardly or downwardly. The member 11 has a bottom bracket 15, secured thereto, and this bottom bracket 15 has a guide 16 secured thereto by means of bolts, 17.

A nozzle 18 is slidably mounted in the said guide 16 and it is provided with a groove 19' into which the head of a screw 20 projects. The screw 20 is connected to guide 16, so that the nozzle 18 may move up and down, but cannot revolve about its axis. The upper end of the nozzle 18 is externally threaded as can be clearly seen in Fig. 3, and it is surrounded by an internally threaded lower nut 21, provided with handholds 22.

This nut 21 is adapted to rest upon the top of the guide 16, and hence by revolving the said nut 21, the nozzle 18 may be moved up and down.

An internal collar 23, provided with a mesh 24, of any suitable wire, is adapted to be mounted within the top of the nozzle 18, and it rests upon a suitable internal shoulder 25 of the said nozzle 18.

Hence, if a piece of cotton gauze or other suitable material is placed upon the wire mesh 24 and below the bottom of the member 9, this can be firmly held in positon upon the wire mesh or gauze 24, by forcing the nozzle upwardly.

The parts are shown in the operative or clamping position in Fig. 2, in which part of a strip C, of absorbent cotton or the like, is clamped between the upper and lower pipes.

In the position shown in Fig. 3, the lower pipe 18 has been separated from the upper pipe which is formed by the bottom of the member 9, so as to enable the strip C to be fed forwardly. The cotton is preferably wound up in a roll, upon a shaft or roller 26, mounted upon standards 27, secured to the bracket 15.

The parts can be assembled and firmly held in position as follows: The rod 6 is mounted within the guide 5 of the cap 4, and which can be done before the handhold 8 is secured thereto. The cap 4 is then screwed into position, as shown in Fig. 2 for example. The bottom cap 9 is then secured to the casing 1, by any suitable means, as for example, by means of cooperating threading, as shown at the upper end of the said casing. The pipe-like bottom of the said lower cap 9 is then inserted through the opening in the upper bracket 10, and by screwing the upper nut 12 upon the said pipe-like extension, it is firmly held and fastened in position. The lower pipe 18 is then held so that the screw 20 can enter within groove 19, and it is then moved upwardly and its upper end is engaged by the lower nut 21, so that the lower pipe 18 can be moved up and down without turning. The end of the strip C is now inserted, as shown in Fig. 1 for example, and after the member 23 has been placed in position as shown in Fig. 3, the lower pipe 18 is forced upwardly until it assumes the position shown in Fig. 2, whereby a liquid-tight closure has been effected around the edges of the member 23. A quart or other measured quantity of milk 19 is then poured into the casing 1, through the holes 3 and the piston 7 is forced downwardly. The pressure of the air compressed within the casing 1 by means of the piston 7 is sufficient to force the milk through the strip C and into some convenient receptacle, located below the bottom of the pipe 18, so that the sediment is deposited upon the strip C.

By lowering the pipe 18 the strip C is released so that a clean portion thereof can be presented to the apparatus to have the sediment deposited thereon.

It is obvious that my device provides a simple and efficient mechanism, which can be readily assembled or dismantled, and which enables a proper and permanent record to be kept of a series of batches of milk. When a series of tests have been completed the material C can be wound up into a roll and thus preserved. The absorbent material clamped as before described prevents the milk from passing out of casing 1, until it is forced out by the pressure of the air compressed by the piston 7.

I have described a preferred embodiment of my invention, but it is clear that numerous changes and omissions can be made without departing from its spirit.

I claim:—

1. In a device for testing milk for sediment, a casing having a bottom orifice, and a piston slidable in said casing, means for clamping a strip of absorbent material against said casing adjacent the said orifice, said absorbent material being adapted to prevent the passage of the milk which is poured into the said casing, the said piston being adapted to force the milk out of said casing through said absorbent material.

2. In a device for testing milk for sediment, the combination of a shaft adapted to carry a roll of absorbent material, means for supporting said shaft, a casing having a pipe-like bottom portion and having a perforation or perforations in the side-wall thereof above said bottom portion, a lower pipe located below said bottom portion of said casing, the said lower pipe having a screen mounted adjacent the top thereof, means for moving said lower pipe so that the end of said strip of absorbent material can be clamped between said bottom portion and the top of said pipe, and a piston located in said casing and adapted to force milk which is poured into said casing through said side perforation or perforations, through said absorbent material and through the said lower pipe.

3. In a device for testing milk for sediment, the combination of a supporting member having substantially parallel and perforated brackets secured thereto, the perforations in said bracket being substantially aligned, a casing having a pipe-like bottom which is externally threaded and which is adapted to be inserted through the perforations of one of the said brackets, a nut adapted to cooperate with the threaded bottom portion of the said casing, so as to hold it in position, a pipe having a longitudinal groove adapted to be inserted through the perforation of the other bracket, a screw secured to the said last mentioned bracket and adapted to enter the said groove so as to prevent the said pipe from turning, the said pipe having an externally threaded end which is adapted to cooperate with a nut mounted adjacent the said bracket, whereby the said pipe can be moved to and fro by the turning of the said nut, a screen member being in the said pipe, and a shaft connected to said member and adapted to carry a roll of absorbent material.

In testimony whereof I hereunto affix my signature.

IRA H. KENDALL.